United States Patent [19]
Suzuki et al.

[11] Patent Number: 6,141,124
[45] Date of Patent: Oct. 31, 2000

[54] COLOR FILTER AND COLOR PICTURE DISPLAY DEVICE USING THE SAME

[75] Inventors: Tetsuji Suzuki; Ryusaku Takahashi, both of Kanagawa-ken; Shintaro Nakagaki, Miura, all of Japan; John E. Gunther, Torrance; Ronald T. Smith, Corona del Mar, both of Calif.

[73] Assignees: Victor Company of Japan, Ltd., Yokohama, Japan; Hughes Aircraft Co., Los Angeles, Calif.

[21] Appl. No.: 08/956,957

[22] Filed: Oct. 23, 1997

[51] Int. Cl.[7] ......................................... G02B 5/32
[52] U.S. Cl. .............. 359/15; 359/19; 359/485; 359/502; 349/5; 349/63; 349/95
[58] Field of Search ................... 359/15, 19, 20, 359/485, 502; 349/5, 9, 63, 95

[56] References Cited

U.S. PATENT DOCUMENTS

| | | |
|---|---|---|
| 4,807,978 | 2/1989 | Grinberg et al. |
| 5,486,934 | 1/1996 | Huang ..................................... 359/488 |
| 5,608,552 | 3/1997 | Smith ......................................... 349/9 |
| 5,784,181 | 7/1998 | Loiseaux et al. ........................ 359/19 |

FOREIGN PATENT DOCUMENTS

| | | |
|---|---|---|
| 0777136 | 6/1997 | European Pat. Off. . |
| 2-500937 | 3/1990 | Japan . |
| 6-308332 | 11/1994 | Japan . |
| 9-189809 | 7/1997 | Japan . |

*Primary Examiner*—Darren Schuberg
*Attorney, Agent, or Firm*—Anderson, Kill & Olick P.C.

[57] ABSTRACT

A color filter which, in a reflection type color picture projector using a polarized light component as a projection light, improve the utilization factor of light and a color picture display device using the same color filter are provided. The color filter 3 using a transmission type hologram diffracts and spectroscopically separates P polarized light components related to respective primary colors and condenses them to pixel electrodes 13r, 13g, and 13b on the side of an LCD panel 1. A reflection light which is modulated by an optical modulator 16 on the side of the LCD panel 1 and becomes S polarized light component is incident on the color filter 3. The color filter 3 transmits the S polarized light component and uses it as the projection light. Since the color filter 3 can diffract a P polarized light component at diffraction efficiency of about 100% while restricting the diffraction efficiency of S polarized light component to about 3%, which is substantially advantageous compared with diffraction of S polarized light component, the utilization factor of light can be improved

7 Claims, 10 Drawing Sheets

FIG. 12 *PRIOR ART*
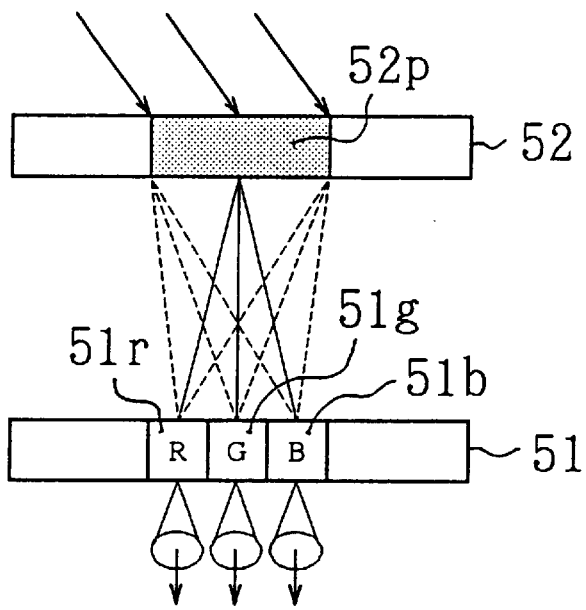
FIG. 13 *PRIOR ART*
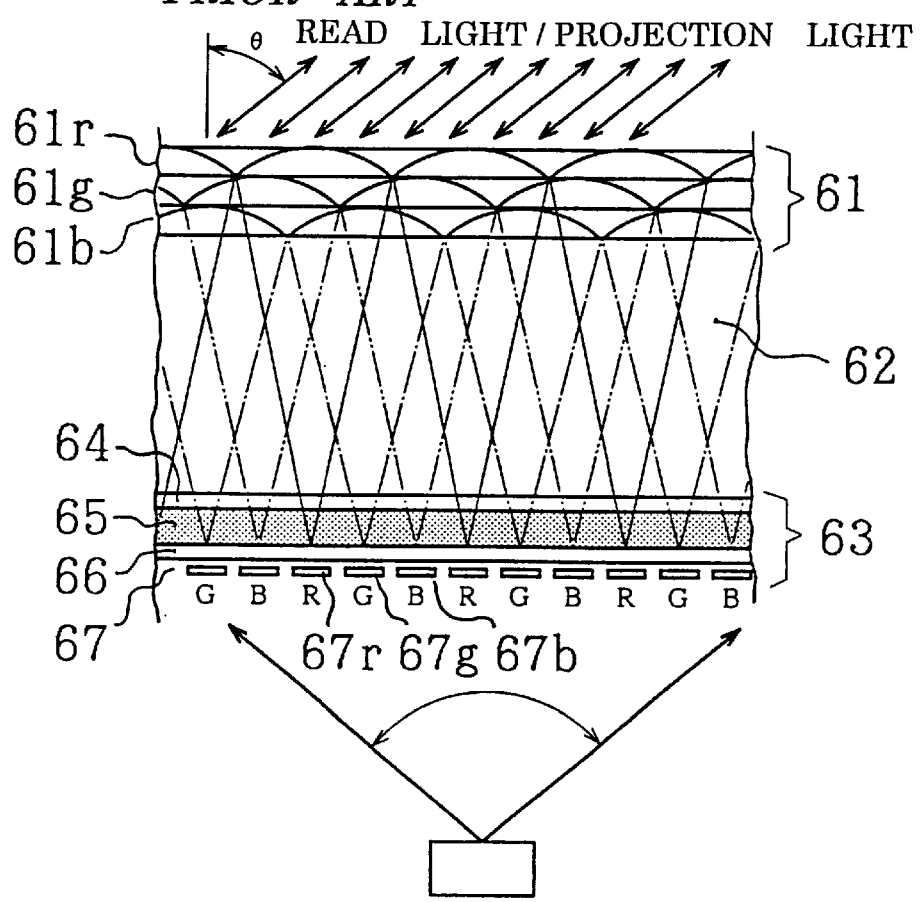

COLOR FILTER AND COLOR PICTURE DISPLAY DEVICE USING THE SAME

BACKGROUND OF THE INVENTION

1. Field of the Invention

The present invention relates to a color filter applicable to a system for displaying a picture or imaging(recording) a picture or other picture Processing systems and a color picture display device using the same. Particularly, the present invention relates to an improvement of a total light utilization factor in a reflection type color picture display device.

2. Description of the Prior Art

Recently, a projector for displaying a picture on a large screen of a display device, such as an outdoor public display, a management purpose display or a display for displaying a high definition video image has been highly required The projector can be generally classified to a transmission type and a reflection type. In both types, a construction in which read-out light is directed to an LCD (Liquid Crystal Display) panel and modulated in pixel unit correspondingly to a video signal is employed.

The LCD panel is constructed with switching elements such as thin film transistors formed on a semiconductor substrate, an active matrix substrate on which pixel electrodes whose potentials are controlled by the switching elements are arranged, a common electrode film formed on a transparent substrate (glass substrate etc.) and a liquid crystal layer sealed in between the active matrix substrate and the common electrode film.

Read-out light is modulated by making potential differences between the common electrode film and the respective pixel electrodes different correspondingly to the video signal to control orientation of the liquid crystal.

The difference between the transmission type projector and the reflection type projector resides in that, in the former type projector, the active matrix substrate is transparent and light transmitted through the LCD panel is used as projection light, while, in the latter type projector, the pixel electrodes on the active matrix substrate are constructed as electrodes for controlling orientation of liquid crystal through reflection electrodes or dielectric mirror films, etc., and reflection light reflected by the LCD panel is used as projection light.

In general, comparing with the transmission type, the reflection type projector does not require black stripes on the liquid crystal layer and an aperture factor of the liquid crystal cell portion is large.

Further, since, in the reflection type projector, heat generation due to absorption of read-out light is very small, it is possible to direct read-out light having large power to the LCD panel, resulting in brighter picture.

In a conventional color picture projector of transmission type, a color picture is obtained by using three transmission type LCD panels corresponding to three primary colors (R, G, B) and a three color synthesizing optical system for synthesizing lights transmitted through the LCD panels.

Since, however, such projector becomes large in size and its manufacturing cost becomes high, a device in which a single color filter including transparent pixel electrodes for the respective colors of the LCD panel provided in a stripe, mosaic, or delta arrangement and filter elements of the respective colors arranged correspondingly to the pixel electrode arrangement and by which a color projection light can be obtained by using a single system has been proposed.

Incidentally, the filter elements of the color filter for the respective primary colors are adjacently located in different positions on a flat plane. These filter elements located in the different positions constitute a sub pixel having a small area and lights from the adjacent R, G, and B filter elements are sensed by eyes as a pixel having a color which is a mixture of R, G, and B colors.

In the projector having the described construction, however, only one primary color of the read light (white light) which passed through the LCD panel and is incident on the color filter can pass through the color filter and color components of the other 2 primary colors thereof are not utilized.

Further, since the transmittance of the color filter itself is low and, in addition, the transmission type LCD panel has stripes, a total utilization factor of light of such projector is very low.

In view of this, a color filter utilizing a transmission type hologram has been proposed for the color picture projector of the transmission type (cf. Japanese Patent Application Laid-open Nos. H2-500937 and H6-308332).

FIG. 12 shows an example of the color picture projector disclosed in Japanese Patent Application Laid-open No. H6-308332. In FIG. 12, a color filter 52 of a transmission type hologram is arranged opposed to an LCD panel 51. The color filter 52 diffracts and spectroscopically separates an incident read light to respective R, G, and B color components by the diffraction and spectroscopic separation functions thereof and condenses them to transparent pixel electrodes 51r, 51g, and 51b of the LCD panel 52 corresponding to the respective colors.

The transparent type hologram of the color filter includes an array of unit holograms 52p arranged with the same pitch as that of groups of the transparent pixel electrodes 51r, 51g, and 51b on the side of the LCD panel 51. The unit hologram 52p condenses wavelength band components of R, G, and B colors to the respective transparent pixel electrodes 51r, 51g, and 51b while making the angle of diffraction of these components different.

Therefore, according to this construction, it is possible to realize a color projector which can utilize the incident light efficiently.

On the other hand, Japanese Patent Application Laid-open No. H2-500937 discloses, in addition to a similar transmission type projector to that mentioned above, which uses a color filter having a transmission type hologram constituted with holography lens arrays, a reflection type projector.

FIG. 13 shows an example of the transparent type projector.

In FIG. 13, reference numerals 61, 62, and 63 denote a color filter having laminated three holography lens array layers, a glass substrate and a transparent type LCD panel, respectively.

The LCD panel 63 is constituted with a transparent common electrode 64, a liquid crystal layer 65, a reflection film 66 and a pixel electrode layer 67 having R, G, and B pixel electrodes 67r, 67g, and 67b arranged thereon, all of which are laminated. The respective pixel electrodes 67r, 67g, and 67b are supplied with potentials by electron beam or control light beam scanning a rear surface of the LCD panel 63.

The color filter 61 is constituted with a holography lens array 61r for diffracting only R color component of a read light, a holography lens array 61g for diffracting only G color component and a holography lens array 61b for diffraction only B color component, all of which are laminated. As shown in FIG. 13, the respective holography lenses 61r, 61g, and 61b are arranged with a pitch three times of the pitch of the pixel electrodes 67r, 67g, and 67b.

In this projector, the virtual lenses, that is, the holography lens arrays 61r, 61g, and 61b, diffract only color components related to the respective arrays and condense them onto the pixel electrodes 67r, 67g, and 67b arranged on optical axes of the respective lenses.

Although areas covered by the respective lenses are overlapped, the array 61r diffraction only the R color component and passes the G and B color components since the lens arrays 61r, 61g and 61b diffract only the corresponding wavelength band components of the read light, respectively. Similarly, the lens array 61g diffracts only the G color component and passes the B color component and the lens array 61b diffraction only the B color component.

As a result, the R, G, and B color component lights diffracted by the respective holography lens arrays 61r, 61g, and 61b are incident on the liquid crystal layer 65, reflected by the reflection film 66 corresponding to the areas of the pixel electrodes 67r, 67g, and 67b and then incident again on the lens arrays 61r, 61g, and 61b.

The reflected R, G, and B color component lights are modulated in the liquid crystal layer 65 in pixel unit.

The modulated respective color component lights are incident again on the lens arrays 61r, 61g, and 61b, diffracted again thereby and returned in a direction toward a light source of the read light.

In general, in order to improve the diffraction efficiency of hologram (a ratio of intensity of a primary diffraction light to intensity of incident, regenerative illumination light), it is necessary to make an angle between a reference light and objective light in producing hologram large.

In view of this, the angle ($\theta$) between reference light and objective light is made large so that the read light falls on the color filter 61 at the incident angle $\theta$, in this projector.

Therefore, it is necessary, in this projector, to direct the read light to the color filter 61 through a polarizing beam splitter (not shown) and to project a projection light through the same. However, when such polarizing beam splitter is used, contrast ratio is substantially lowered and light utilization factor is lowered due to the angle dependency thereof Further, since the polarizing beam splitter itself is expensive, the cost of the whole projector becomes high.

3. Description of Previously Proposed Art

Under the circumstance, the present inventors have studied the diffraction efficiency characteristics of hologram in detail. As a result, the present inventors have found that a P polarized light component of diffraction light diffracted by hologram (a polarized light component having a vibration plane parallel to an incident plane) is different in diffraction efficiency from an S polarized light component (a component vibrating in a vertical direction to the P polarized light component) and have proposed a reflection type color picture projector and a color filter for use therein which has a high light utilization factor and generally does not require a beam splitter and with which a high contrast ratio is realized (Japanese Patent Application No. H7-315956).

The proposed projector is based on the characteristics that, when the bend angle (an angle between an incident light and a diffraction light) of the diffraction phenomenon due to hologram is large, there is no substantial difference in diffraction efficiency between the S polarized light component and the P polarized light component, with the difference being increased with reduction of the bend angle.

This characteristics will be described in detail with reference to FIG. 14.

A characteristics curve shown in FIG. 14 was obtained by calculating diffraction efficiency of P polarized light component when a thickness t of hologram is set such that, under condition of incident light wavelength of 540 nm and a modulation amount $\Delta n$ of diffractivity for a hologram sensitive material of 0.03, diffraction efficiency of S polarized light component at respective bend angles becomes 100%.

As is clear from FIG. 14, with large bend angles, diffraction efficiency of both the S and P polarized light components is substantially 100%. With bend angle equal to or smaller than 120 degrees, it is possible to make diffraction efficiency of the P polarized light component equal to or smaller than 50% and, by making bend angle closer to 90 degrees, the diffraction efficiency can be made 0%.

Further, this diffraction efficiency characteristics substantially depends upon the incident light wavelength. Therefore, by utilizing this wavelength dependency of the diffraction efficiency characteristics, it is possible to perform an optimum design of the color filter such that the S polarized light component is diffracted at diffraction efficiency of substantially 100% while the diffraction efficiency of the P polarized light component is very small, for a desired wavelength.

Therefore, it is possible to constitute a color filter utilizing transmission type hologram as a holography lens array which diffracts only the S polarized light component in wavelength bands of the respective R, G, and B colors at high diffraction efficiency while restricts the diffraction efficiency of the P polarized light component.

FIGS. 15 to 17 show relations between diffraction efficiency and incident light wavelength of holograms for R, G, and B color lights based on the optimized design conditions when bend angle is 75 degrees, respectively.

In FIGS. 15 to 17, solid curves indicate S polarized light component and dotted curves indicate P polarized light component. From FIGS. 15 to 17, it is clear that diffraction efficiency of S polarized light component of each of the R, G, and B color components is about 100% in the vicinity of a center wavelength thereof and that of P polarized light component at the same wavelength is restricted to equal to or smaller than about 18%.

When the color filter constituted with holograms having the characteristics shown in FIGS. 15 to 17 is used in a reflection type color picture projector with an incident angle $\theta$ of a read light on the color filter being 75 degrees (=180−105; bend angle=105 degrees), it is possible that the holograms for the respective colors mainly diffract only S polarized light components and emit S polarized light components vertically to the side of the pixel electrodes for the corresponding colors.

The S polarized light components emitted from the color filter and incident on a surface of the liquid crystal layer are reflected by a pixel electrode side of the liquid crystal layer and incident again on the color filter through the liquid crystal layer. In this passage, the S polarized light components are modulated.

For example, when the liquid crystal layer includes vertically oriented liquid crystal, the state of orientation of the liquid crystal is changed correspondingly to a video signal supplied to the pixel electrodes for the R, G, and B color components and the S polarized light components are modulated correspondingly to the video signal. Thus, a portion or whole of the S polarized light component becomes P polarized light component depending upon the degree of modulation and is incident again on the color filter.

The P polarized light component incident again on the color filter passes therethrough without substantial diffraction and is emitted therefrom since he color filter mainly diffracts only the S polarized light component.

The main feature of the projector proposed in Japanese Patent Application No. H7-315956 by the same assignee as that of this application resides in that the P polarized light component which is incident again on the color filter, passes therethrough and emitted therefrom is used as a projection light to project a color picture on a screen through a projection lens, etc.

Therefore, the projection light is the P polarized component which does not return to the direction toward the light source of the read light and is emitted in a normal direction of the color filter. As a result, it is possible to display a high quality color image having a good contrast ratio with high utilization factor of light and without necessity of providing a polarization beam splitter.

The P polarized light component of the read-out light which is incident on the color filter passes straight therethrough as zero order light since it is not diffracted substantially. Since this P polarized component falls on the color filter at the incident angle of 75 degrees, it is reflected by the pixel electrode side surface of the color filter at a reflection angle equal to the incident angle and then incident again on the color filter. Looking this phenomenon from the color filter, the incident angle of the P polarized component on the color filter is −75 degrees. Therefore, it passes therethrough as it is without diffraction.

Therefore, the P polarized component which becomes the zero order light is emitted in a direction which is completely different from the incident direction of the S polarized light component which becomes the projection light or the read light, so that it does not give any influence on the picture display.

Although the S polarized component produced correspondingly to the degree of modulation in the liquid crystal layer and the S polarized component which is produced by modulation of the P polarized component which is diffracted by the color filter with low diffraction efficiency are also incident on the color filter. These S polarized components, however, return toward the light source of read-out light.

As mentioned previously, the present inventors have noticed the fact that the diffraction efficiency of P polarized light component of a hologram for an incident light is much different from that of S polarized light component under the constant condition and proposed in Japanese Patent Application No. H7-315956 a reflection type color picture projector using a color filter constructed with transmission type holograms in which a read light is diffracted and polarized to wavelength bands of respective R, G and B colors, only S polarized light components are mainly diffracted and emitted to the side of pixel electrodes related to the respective colors corresponding thereto and only P polarized light component obtained by modulating the S polarized light component by a liquid crystal layer is emitted from the color filter as a projection light and the color filter itself.

In the proposed color filter, in order to increase the difference in diffraction efficiency between the S polarized light component and the P polarized light component, the incident angle θ of the read light with respect to the color filter is set equal to or larger than 60 degrees and smaller than 90 degrees, preferably, in a range from 70 to 80 degrees.

However, when the incident angle of the read light is set to such large value, a cross sectional area of the read light taken vertically with respect to a propagating direction of the read light becomes small, resulting in a reduction of illumination efficiency. That is, there is a relation Sr=Sa×cos θ between a cross sectional area Sr of the read-out light, an illuminated area Sa for the color filter and the incident angle θ. Therefore, when the incident angle θ is increased, Sr becomes very small since Sa is constant and, when Sr becomes small, the illumination efficiency is reduced for the reason mentioned below.

In general, although, in order to improve the contrast ratio and the color reproducibility characteristics, it is preferable to make the read light as parallel as possible, it is impossible to obtain a completely parallel light since a light source has a definite size.

Therefore, it is impossible to efficiently collimate the read light to a small area such as a color filter used in a color picture projector. In view of this, it is preferable in order to increase the utilization factor of illumination light to make the cross sectional area Sr of the read light as large as possible.

In other words, the fundamental condition of a color filter that, in order to diffract only S polarized light component attributing to the projection light, the incident angle θ is increased by making diffraction efficiency of S polarized light component as large as possible while making diffraction efficiency of P polarized light component as small as possible and the condition for increasing the utilization factor of the illumination light are contradict each other.

In view of the above, the present inventors have further studied the diffraction efficiency characteristics of P polarized light component and S polarized light component due to holograms and found that a color filter which is superior than the color filter disclosed in Japanese Patent application No. H7-315956 can be constructed.

SUMMARY OF THE INVENTION

An object of the present invention is to provide a color filter having a new construction and a color picture display device whose total utilization factor of light is improved by using the color filter.

According to a first aspect of the present invention, a color filter using holograms for diffracting and separating an incident light to a plurality of lights having different wavelength bands and selectively condensing the lights having the respective wavelength ranges onto positions of corresponding color pixels is provided, in which the holograms diffract and separate mainly P polarized light component among incident lights which has a vibration plane parallel to an incident plane on which the lights are incident and condense it to a corresponding color pixel position while pass S polarized light component having a vibration plane vertical to the incident plane as it is.

In general, diffraction efficiency η of a transmission type hologram depends upon a modulation amount Δn of diffractivity, a thickness t of the hologram and an incident angle θ of light. Under the condition of the incident angle θ set to a large value in a range from 60 to 90 degrees, diffraction efficiency η p of P polarized light component and diffraction efficiency η s of S polarized light component have tendencies of periodic change in different phase with respect to a change of a function F(Δn, t) including Δn and t as variables, as shown in FIG. 18.

On the other, when the incident angle θ is reduced to zero while Δn and t are kept constant, phase related to diffraction efficiency η p of P polarized light component approaches phase related to diffraction efficiency η s of S polarized light component and diffraction efficiencies of P and S polarized light components coincide theoretically when θ=0.

In the characteristics curves of diffraction efficiencies η p and η s shown in FIG. 18, when the incident angle θ is set as 75 degrees and a value of the function F(Δn, t) is set as a point A by selecting values of Δn and t, the difference between diffraction efficiency η p of the P polarized light component and diffraction efficiency η s of the S polarized light component when bend angle is 105 (=180−75) degrees in the case shown in FIG. 14 is obtained and it becomes possible to produce the holograms related to R, G, and B as show in FIGS. 15 to 17.

Considering the tendency of change of diffraction efficiencies η p and η s shown in FIG. 18, |η p−η s| is larger in the vicinity of a point B rather than the point A and, when the hologram is produced under condition corresponding to B, η p and η s become 100% and 0%, respectively.

That is, in the proposal in Japanese Patent Application No. H7-315956, the hologram is produced in order to diffract and separate mainly the S polarized light component and to restrict diffraction of the P polarized light component and is used in the color filter. On the contrary, the present inventors have found that, by diffracting and spectroscopically separating the P polarized light component mainly and restricting diffraction of the S polarized light component, it is possible to utilize a more advantageous condition.

According to the first aspect of the present invention, an ideal color filter utilizing an optimum condition corresponding to the point B shown in FIG. 18 is provided.

According to a second aspect of the present invention, a reflection type color picture projector having at least a color filter comprising holograms, an optical modulation layer and a reflection layer, wherein the color filter diffracts and spectroscopically separates P polarized light components of a read light incident obliquely on an incident plane thereof which have a vibration plane parallel to the incident plane, condenses it to color pixel positions on the reflection layer and allows S polarized light components thereof which have a vibration plane vertical to the incident plane to pass through, wherein the P polarized light components diffracted and spectroscopically separated by the color filter are transmitted through the optical modulation layer and reflected by the reflection layer and the S polarized light components and wherein, among light components obtained from the P polarized light components diffracted and spectroscopically separated by the color filter which are transmitted through the optical modulation layer, reflected by the reflection layer, transmitted through the optical modulation layer again and incident on the color filter, S polarized light components which are modulated by the optical modulation layer and transmitted through the color filter without diffraction are used as a projection light.

This invention resides in that the color filter is applied to a reflection type color picture display device.

The operation principle thereof is substantially the same as that of the device disclosed in Japanese Patent Application No. H7-315956.

The operational feature of the present invention resides in that, since the P polarized light components are mainly diffracted and spectroscopically separated by the color filter, light which is re-incident on the color filter after modulated by the optical modulation layer during a reciprocal propagation thereof between the color filter and the reflection layer becomes S polarized light components which are transmitted through the color filter without diffraction and utilized as the projection light.

Since, on the basis of the characteristics of the present color filter, the difference between the diffraction efficiencies of the respective polarized light components becomes large compared with the projector disclosed in Japanese Patent Application No. H7-315956 in which the S polarized components are mainly diffracted and spectroscopically separated, it is possible to improve the utilization factor of light.

Further, since it is possible to restrict the diffraction efficiency of the S polarized light component while maintaining the diffraction efficiency of the P polarized light component at the maximum and thus the incident angle of the incident light can be made wider, it is possible to improve the illumination efficiency by reducing the incident angle of the read light.

According to a third aspect of the present invention, a color picture display device is provided, which comprises at least a color filter having a hologram, an optical modulation layer and a reflection layer, said color filter being adapted to diffract and spectroscopically separate mainly one of a P polarized light component of an obliquely incident read light having a vibration plane parallel to an incident plane thereof or S polarized light components thereof having a vibration plane vertical to the incident plane and condense them to corresponding color pixel positions in the reflection layer while transmit the other polarized light components as they are and, among light components obtained from the one polarized light components diffracted and spectroscopically separated by the color filter which are transmitted through the optical modulation layer, reflected by the reflection layer, transmitted through the optical modulation layer again and incident on the color filter, polarized light components which are modulated by the optical modulation layer and transmitted through the color filter without diffraction being used as a projection light, wherein an optical distance between the color filter and the reflection layer is shorter or longer than a focal length produced by the diffraction function of said color filter.

This color picture projector can be applied to both the projector disclosed in Japanese Patent Application No. H7-315956 and the display device according to the second aspect of the present invention regardless of polarized light component which is to be diffracted and spectroscopically separated by the color filter.

Since, these devices, one (referred to as "first polarized light component" hereinafter) of polarized light components of the read light is mainly diffracted and spectroscopically separated by the color filter and condensed to the corresponding pixel positions of the reflection layer, its focal length is set equal to the optical distance between the color filter and the reflection layer.

In this case, the unit hologram of the color filter can be deemed as a virtual lens and the first polarized light component is modulated by the optical modulation layer during its reciprocal passage between the color filter and the reflection layer and re-incident on the color filter as a polarized light component (referred to as "second polarized light component", hereinafter) having a vibration plane vertical to that of the first polarized light component. However, the re-incident light path of the second polarized light component is substantially the same as that of light containing the first polarized light component and a small amount of the second polarized light component obtained by diffracting and spectroscopically separating the read light incident on the same position and emitted to the optical modulation layer.

It should be noted that the color filter does not diffract only the first polarized light component of the read light and diffracts the second polarized light component too although the ratio of the latter is small. For example, the diffraction efficiency of the second polarized light component is about 15% in the device disclosed in Japanese Patent Application No. H7-315956 and it is necessary in the device according to the second aspect of the present invention that the diffraction efficiency of the second polarized light component is practically about 3 to 5% even if it becomes 0% under the ideal design condition.

Therefore, according to the principle of reversibility of light-path, the path of the second polarized light component re-incident on the color filter coincides with the diffraction condition corresponding to the previously mentioned rate of diffraction of the color filter and a portion thereof is returned toward the source of read light.

Since this phenomenon device occurs throughout the area of the virtual lens in the color filter, a portion of the second polarized light component which is to be the projection light and the utilization factor of light is lowered In the present invention, in order to improve the utilization factor of light, such phenomenon is prevented from occurring in a singular plane or in the vicinity thereof by making the optical distance between the color filter and the reflection layer different from the focal length provided by the diffraction function of the color filter.

These and other objects and features of the present will become more apparent from the detailed description thereof in conjunction with the accompanying drawings. It should be noted that the drawings are used to understand the content of the present invention and are not intended to limit the scope of the present invention.

BRIEF DESCRIPTION OF THE DRAWINGS

FIG. 12 shows schematically a construction of a conventional transmission type color picture projector disclosed in Japanese Patent Application Laid-open No. H6-308332;

FIG. 13 shows schematically a construction of a conventional reflection type color picture projector disclosed in Japanese Patent Application Laid-open No. H2-500937;

DESCRIPTION OF THE PREFERRED EMBODIMENTS

Embodiments of a color filter and a color picture projector according to the present invention will be described in detail with reference to FIGS. 1 through 11.

[Embodiment 1]

Figure 1:
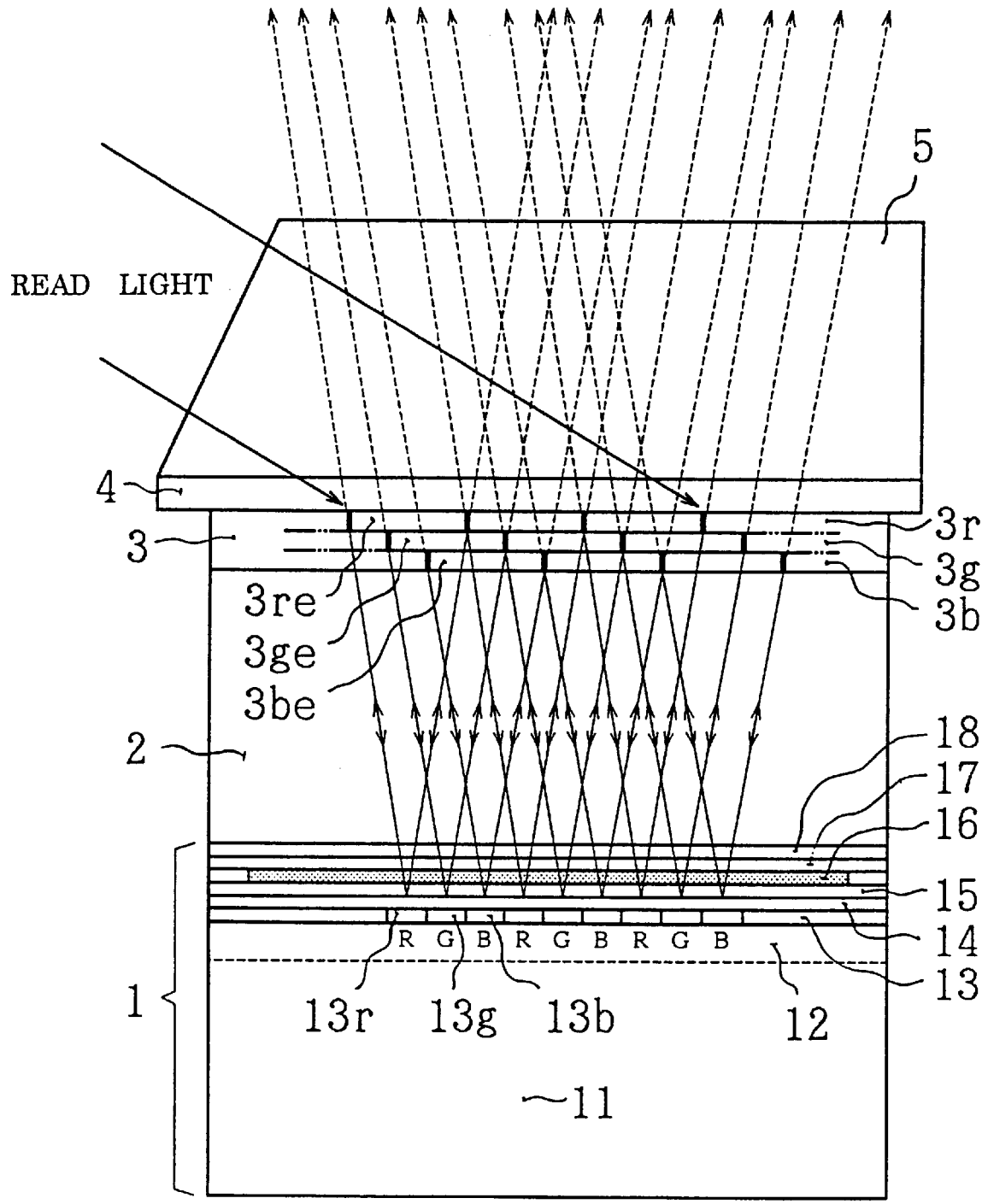
FIG. 1 graphically shows a structure of a transmission type color picture display device of a reflection type, according to an embodiment of the present invention.

FIG. 1 is a cross section graphically showing a structure of a reflection type color picture projector according to the first embodiment.

In FIG. 1, reference numerals 1, 2, 3, 4, and 5 denote an LCD panel, a thin glass layer, a color filter, a glass substrate, and a coupling prism, respectively.

The LCD panel 1 is constructed by laminating, on a glass substrate or a silicon substrate 11, an active matrix drive circuit 12, a pixel electrode layer 13 including pixel electrodes 13r, 13g and 13b arranged regularly and driven selectively by the active matrix drive circuit 12, a dielectric mirror film 14, an orientation film 15, an optical modulation layer 16 containing liquid crystal sealed in a space thereof defined by spacers, an orientation film 17 and a transparent common electrode film 18, in the order.

These constructive components, except those described already and those which are well known, will be described.

The pixel electrodes 13r, 13g, and 13b of the pixel electrode layer 13 correspond to R, G, and B colors, respectively, and constitute sub pixels. A set of these three sub pixels constitute a pixel.

Figure 2A:
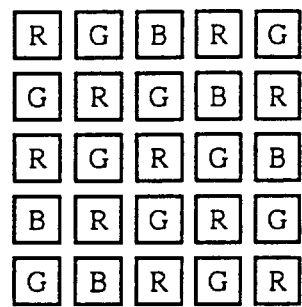
FIG. 2(A) shows a mosaic arrangement of basic arrangements of pixel electrodes.
Figure 2B:
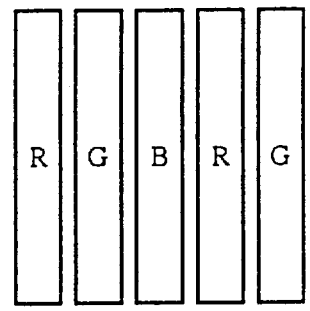
FIG. 2(B) shows a stripe arrangement of the basic arrangements of pixel electrodes.
Figure 2C:
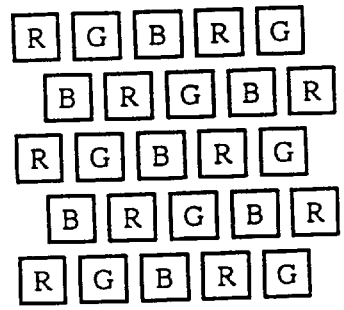
FIG. 2(C) shows a delta arrangement of the basic arrangements of pixel electrodes.

The sub pixels are usually arranged in a plane in one of a mosaic, a stripe, and a delta patterns as shown in FIGS. 2(A), 2(B), and 2(C), respectively.

Figure 3:
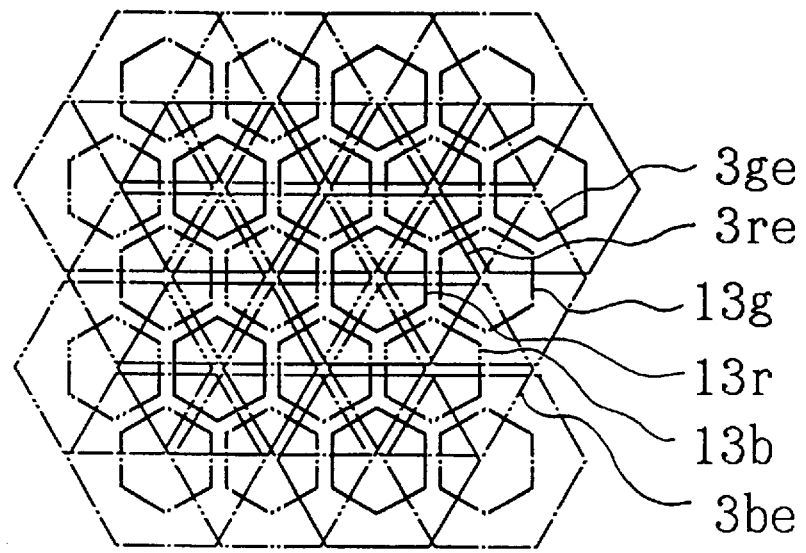
FIG. 3 is a plan view of a hexagonal dense (honeycomb) arrangement of pixel electrodes, showing a positional relation of holography lenses corresponding to the pixel electrodes.
Figure 4:
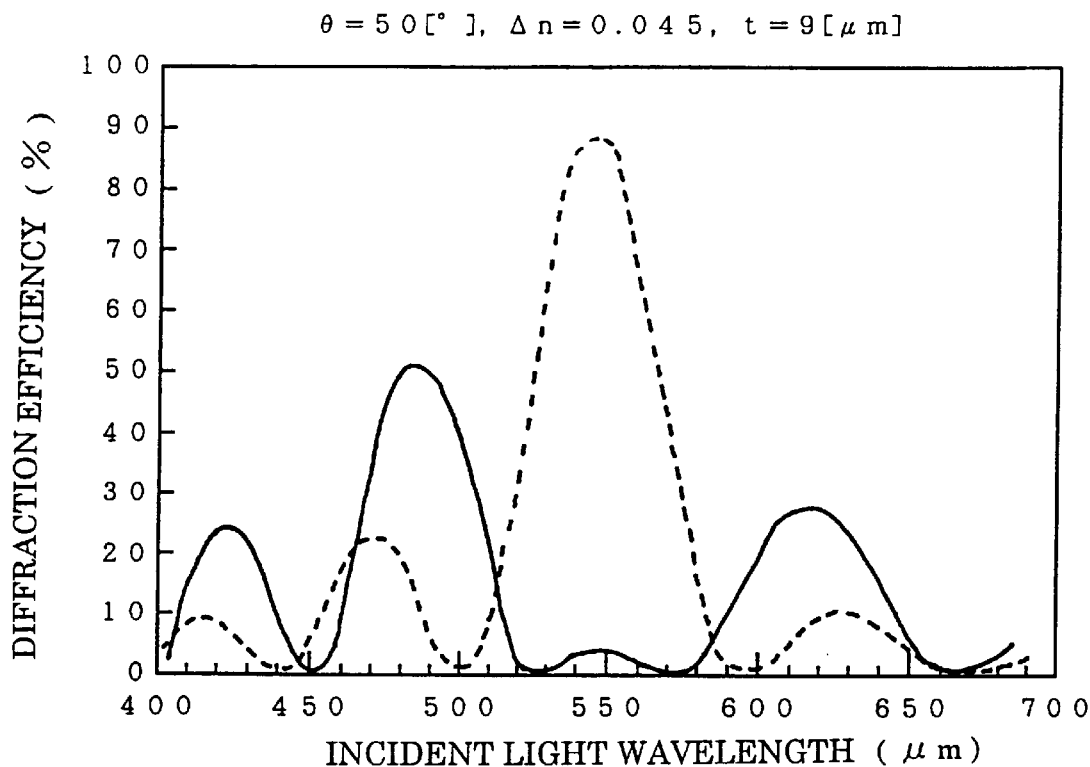
FIG. 4 is a graph showing diffraction efficiency characteristics of a hologram for a P polarized light component and an S polarized light component, a wavelength range of the incident light being 400 to 700 nm, under condition of an incident angle θ of an incident light of 50 degrees, modulation amount Δn of diffraction of 0.045 and thickness t of 9 μm.

In a case of the delta arrangement, a hexagonal dense (honeycomb) arrangement is usually employed as shown in FIG. 3. In this embodiment, the hexagonal arrangement shown in FIG. 3 is employed, in which the sub pixels are arranged laterally in the order of R, G, and B with the pixel electrodes 13r, 13g, and 13b being adjacent to each other in the plane. In order to prevent photo-conduction due to immigration of a read light to the substrate 11 from occurring, a light shield layer may be provided between the pixel electrode layer 13 and the active matrix drive circuit 12.

The optical modulation layer 16 may contain a liquid crystal having an operation mode such as TN mode, HFE mode, FLC mode, or DS mode, etc. The orientation films 15 and 17 are provided correspondingly to the kind of liquid crystal used in the optical modulation layer 16 and may be removed when a scattering type liquid crystal having DS mode is used The coupling prism 5 may be formed integrally with the glass substrate 4.

Although, in FIG. 1, a sum of thickness of the glass substrate 4 and the coupling prism 5 is shown as being smaller than the thickness of the thin glass layer 2 for the purpose of explaining the structure of the filter and its optical function, the sum is usually larger than the thickness of the thin glass layer 2 practically.

The color filter 3 is an important constructive component of the present invention and will be described specifically in detail. The color filter 3 is constructed as a transmission type hologram including holography lenses as in Japanese Patent Application Laid-open No. H2-500937 and has a function of diffracting and spectoroscopically separating respective three primary colors R, G, and B contained in an incident light and condensing them substantially vertically to corresponding positions of the respective pixel electrodes of the LCD panel 1. That is, a main ray of a light bundle is incident substantially vertically on the pixel electrodes 13r, 13g, and 13b and condenses the light bundle to the pixel electrodes 13r, 13g, and 13b by its lens function. Exactly, the light bundle is condensed on the dielectric mirror film 14 as shown in FIG. 1. However, in this specification, it will be described as condensing on surfaces of the pixel electrodes 13r, 13g, and 13b since the thickness of the dielectric mirror film 14 is very small compared with the size of the pixel electrodes 13r, 13g, and 13b.

The transmission type hologram has a three layer structure including a holography lens array layer 3r for R color, a holography lens array layer 3g for G color, and a holography lens array layer 3b for B color.

The holography lens arrays 3r, 3g, and 3b include horizontally arranged holography lenses 3re, 3rg, and 3rb corresponding to unit holograms, respectively. The holography lenses 3re, 3ge, and 3be are positioned such that optical axes of them pass through substantial centers of the corresponding pixel electrodes 13r, 13g, and 13b on the side of the LCD panel 1, respectively.

In this embodiment, the pixel electrodes 13r, 13g, and 13b are arranged in the dense hexagonal pattern as shown in FIG. 3. Therefore, the holography lenses 3re, 3ge, and 3be are arranged in the hexagonal pattern shown in FIG. 3 correspondingly to the pattern of the pixel electrodes.

That is, the holography lenses of each of the holography lens layers 3r, 3g, and 3b are arranged with the same vertical and horizontal pitches as those of the pixel electrodes for the associated color. However, looking the holography lenses of the laminated three layers down, the holography lenses 3re, 3ge, and 3be for each color are mutually and partially overlapped and have a positional relation in which the holography lenses 3re, 3ge, and 3be for three colors are arranged with a pitch which is one third of the pitch of the pixel electrodes for one color.

The holography lenses 3re, 3ge, and 3be corresponding to a unit hologram of each of the holography lens array layers 3r, 3g, and 3b are prepared such that their holograms diffract and spectroscopically separate mainly the P polarized light component having a wavelength range of a corresponding color and this is the most important point of this embodiment.

As previously described with reference to FIG. 18, the difference |η p−η S| between diffraction efficiency η p of the P polarized light component and diffraction efficiency η s of the S polarized light component is larger at the point B rather than the point A determined by the modulation amount Δn of diffractivity and the thickness t of the hologram, under the condition of the incident angle θ of the incident light is selected from as large range as from 60 to 90 degrees (see FIG. 18).

That is, in order to obtain a high diffraction efficiency for one of P and S polarized light component while restricting diffraction efficiency for the other polarized light component to a low value, a construction of hologram in which the P polarized light component is mainly diffracted is more advantageous than a construction in which the S polarized light component is mainly diffracted. In the latter construction, it is theoretically possible obtain diffraction efficiency η p of the P polarized light component of 100% and diffraction efficiency η s of the S polarized light component of 0%.

In order to prepare a hologram for diffracting and spectroscopically separate G color, the present inventors have calculated diffraction efficiencies of P and S polarized light components of an incident light having wavelength in a range from 400 to 700 nm by using the incident angle θ, the modulation amount Δn of diffractivity and the thickness t as conditional parameters.

As a result, characteristics such as shown in FIGS. 4, 5, 6, 7, and 8 were obtained under conditions of θ=50 degrees, Δn=0.045 and t=9 μm, of θ=60 degrees, Δn =0.045 and t=8 μm, of θ=70 degrees, Δn=0.045 and t=7 μm, of θ=60 degrees, Δn=0.03 and t=12 μm, and of θ=60 degrees, Δn=0.06 and t=6 μm, respectively.

In FIGS. 4 to 8, dotted lines show the P polarized light component and solid lines show the S polarized light component.

Figure 18:
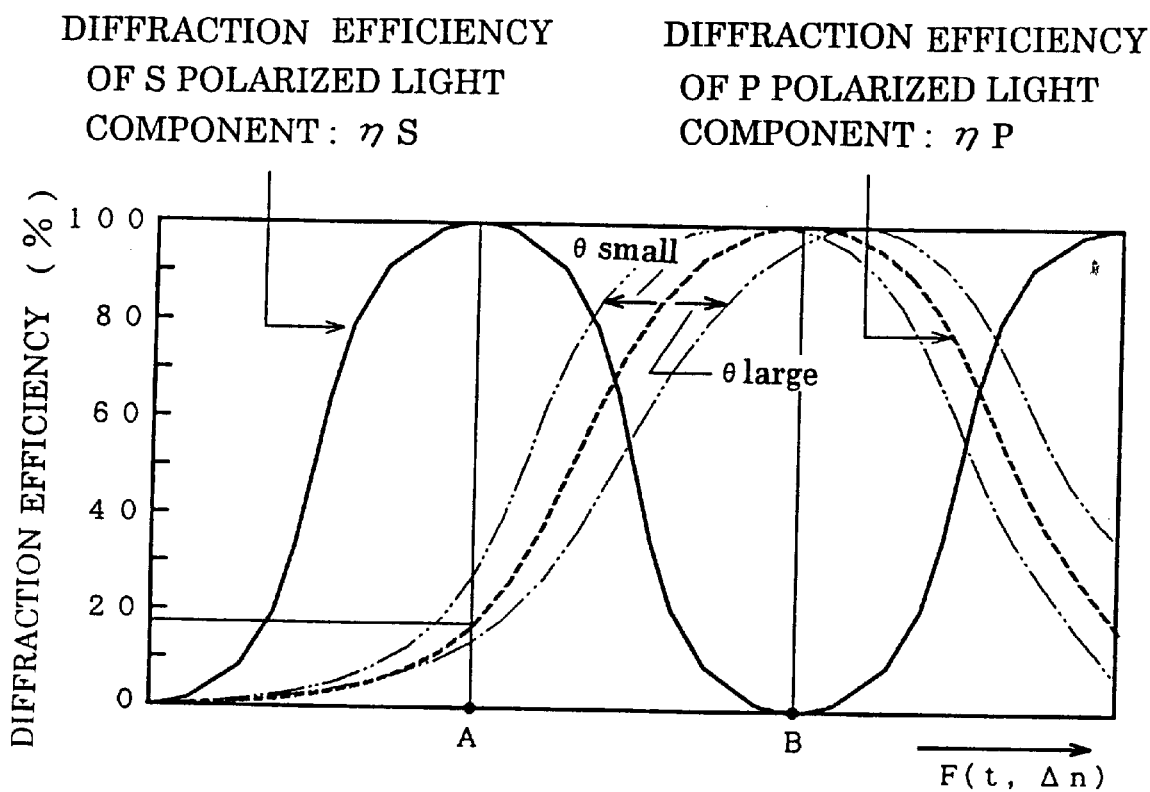
FIG. 18 is a graph showing variations of diffraction efficiency η s of S polarized light component and diffraction efficiency η p of P polarized light component when the incident angle of the incident light is set in a wide range from 60 to 90 degrees and the function F(Δn, t) having the modulation amount Δn of diffraction of the hologram and thickness t thereof as variables is changed.

As is clear from the characteristics shown in FIGS. 4 to 8 and as will be predictable from FIG. 18, it is possible to obtain a high diffraction efficiency η p of the P polarized light component while restricting diffraction efficiency η s of the S polarized light component to 0 to 5%, and a realization of such hologram for G color could be confirmed.

Figure 5:
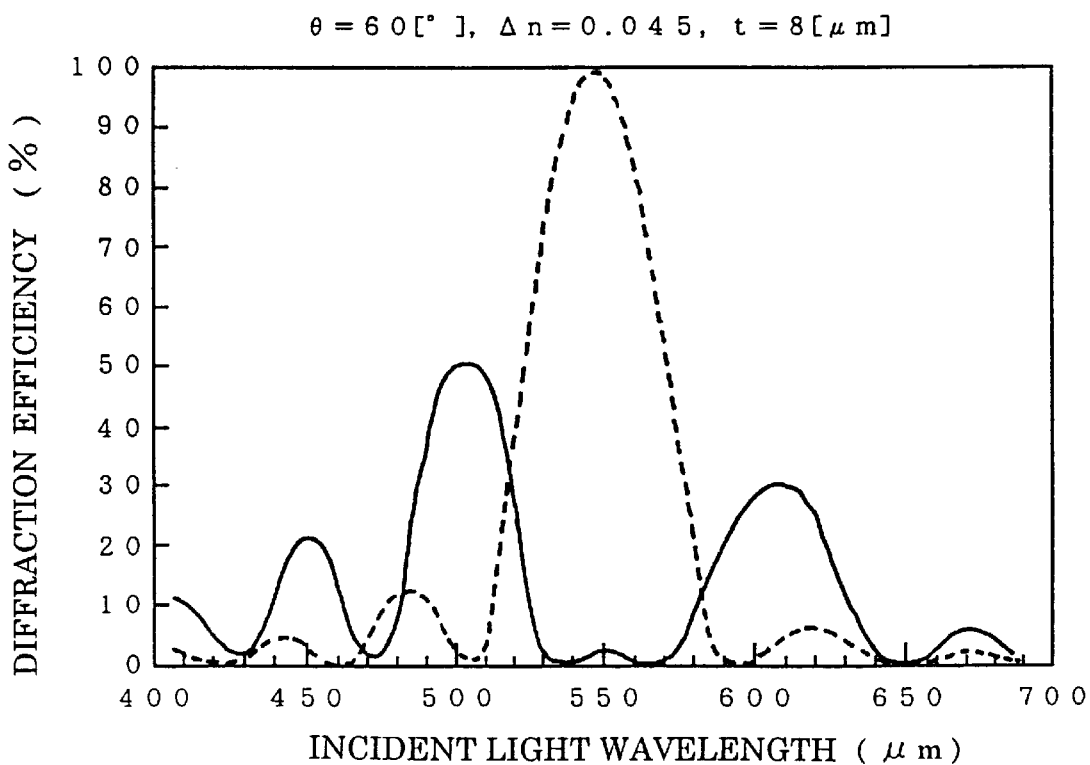
FIG. 5 is a graph showing diffraction efficiency characteristics of a hologram for a P polarized light component and an S polarized light component, a wavelength range of the incident light being 400 to 700 nm, under condition of an incident angle θ of an incident light of 60 degrees, modulation amount Δn of diffraction of 0.045 and thickness t of 8 μm.
Figure 6:
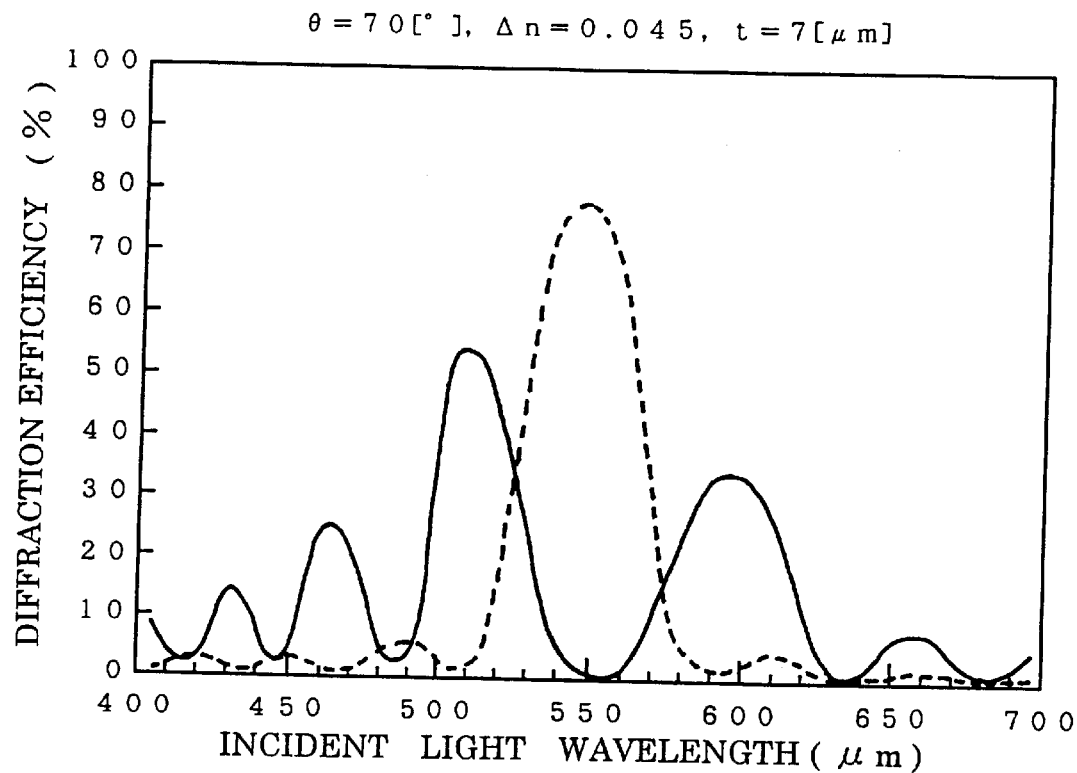
FIG. 6 is a graph showing diffraction efficiency characteristics of a hologram for a P polarized light component and an S polarized light component, a wavelength range of the incident light being 400 to 700 nm, a under condition of an incident angle θ of an incident light of 70 degrees, modulation amount Δn of diffraction of 0.045 and thickness t of 7 μm.
Figure 7:
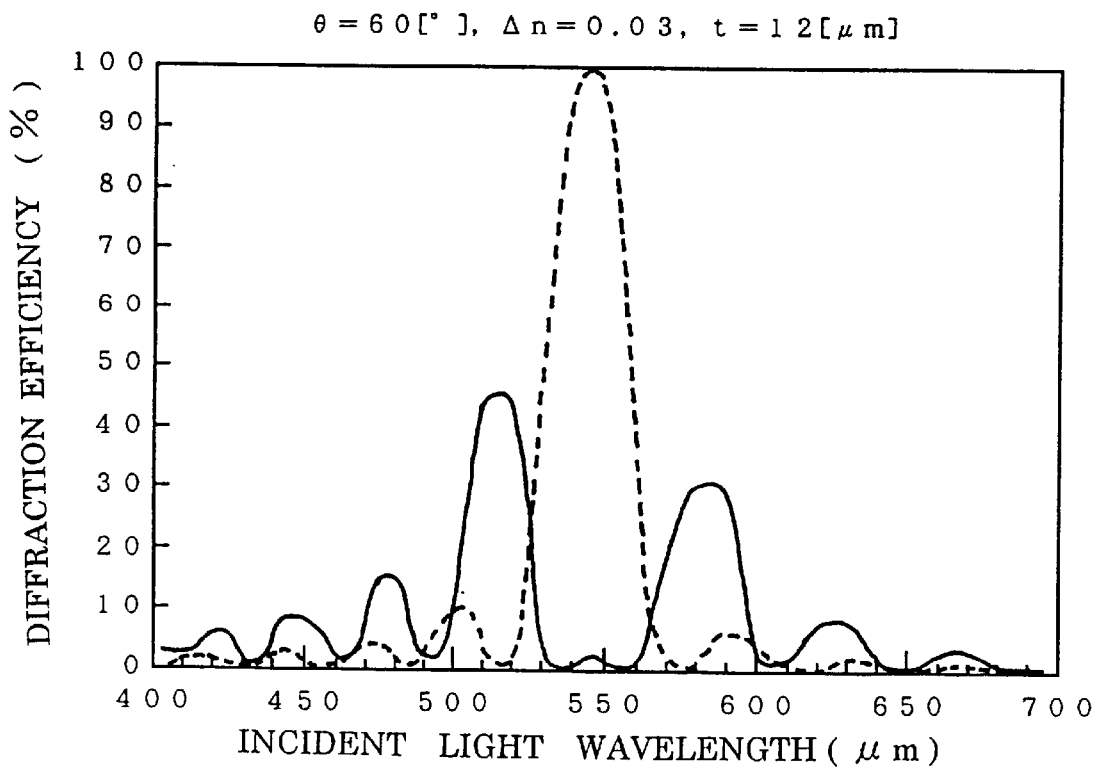
FIG. 7 is a graph showing diffraction efficiency characteristics of a hologram for a P polarized light component and an S polarized light component, a wavelength range of the incident light being 400 to 700 nm, under condition of an incident angle θ of an incident light of 60 degrees, modulation amount Δn of diffraction of 0.03 and thickness t of 12 μm.
Figure 8:
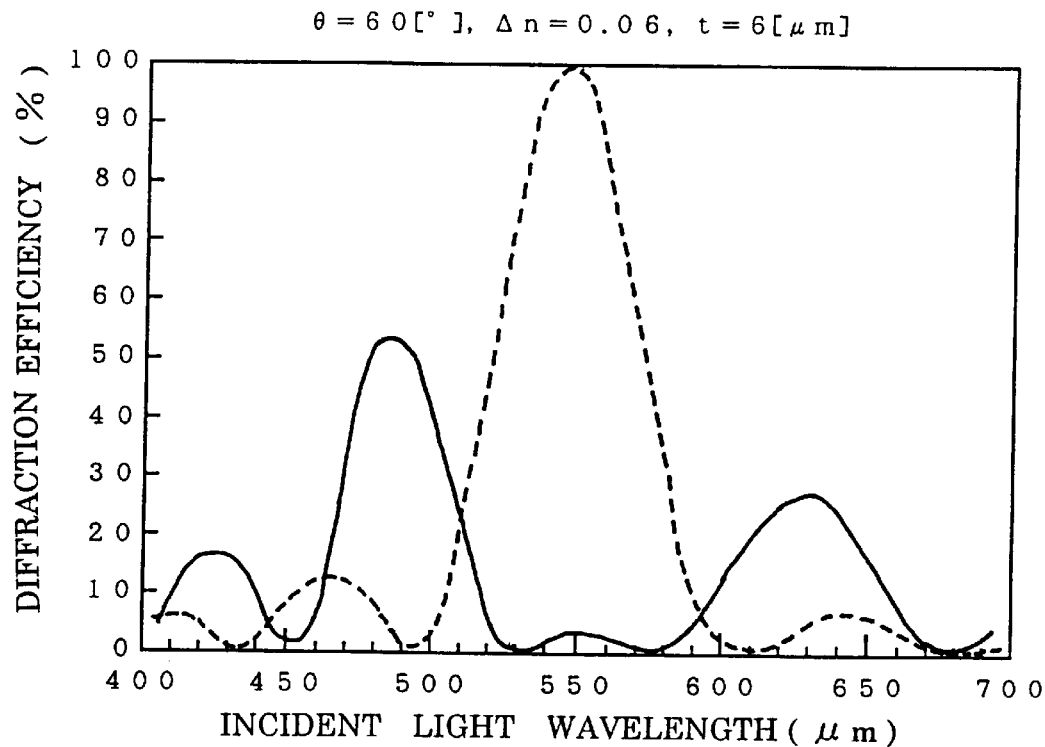
FIG. 8 is a graph showing diffraction efficiency characteristics of a hologram for a P polarized light component and an S polarized light component, a wavelength range of the incident light being 400 to 700 nm, under condition of an incident angle θ of an incident light of 60 degrees, modulation amount Δn of diffraction of 0.06 and thickness t of 6 μm.

Particularly, in the characteristics shown in FIGS. 5, 7, and 8 having the condition of θ=60 degrees, it is possible to make diffraction efficiency of the P polarized light component at the center wavelength of G color 100% while restricting diffraction efficiency of the S polarized light component to about 3% and, in the characteristics shown in FIGS. 5 and 8, it is possible to make (η p–ηs) large over a wide wavelength range.

Figure 16:
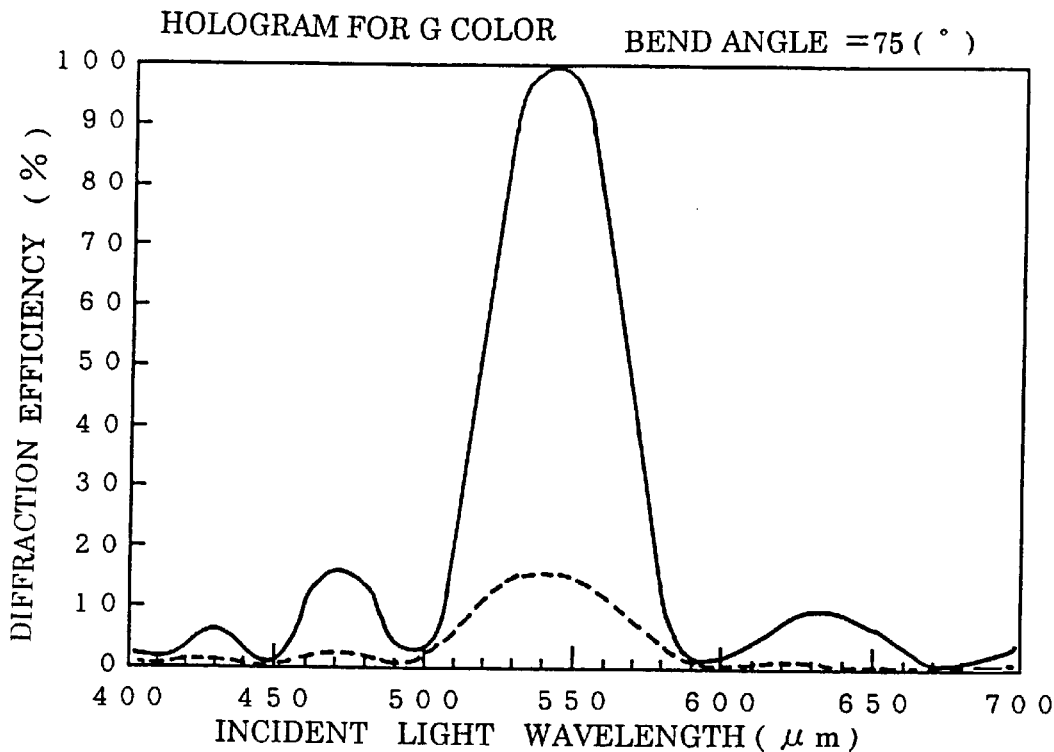
FIG. 16 is a graph showing diffraction efficiency characteristics of P and S polarized light components of an incident light having wave-length range of 400 to 700 nm of a hologram for G color prepared under the optimized design condition with bend angle being 75 degrees.

Comparing with the characteristics shown in FIG. 16 related to Japanese Patent Application No. H7-315956, in which diffraction efficiency of the P polarized light component is as large as about 18% when diffraction efficiency of the S polarized light component is dose to 100%, it can be confirmed that the characteristics shown in FIGS. 5 and 8 are substantially advantageous.

Figure 15:
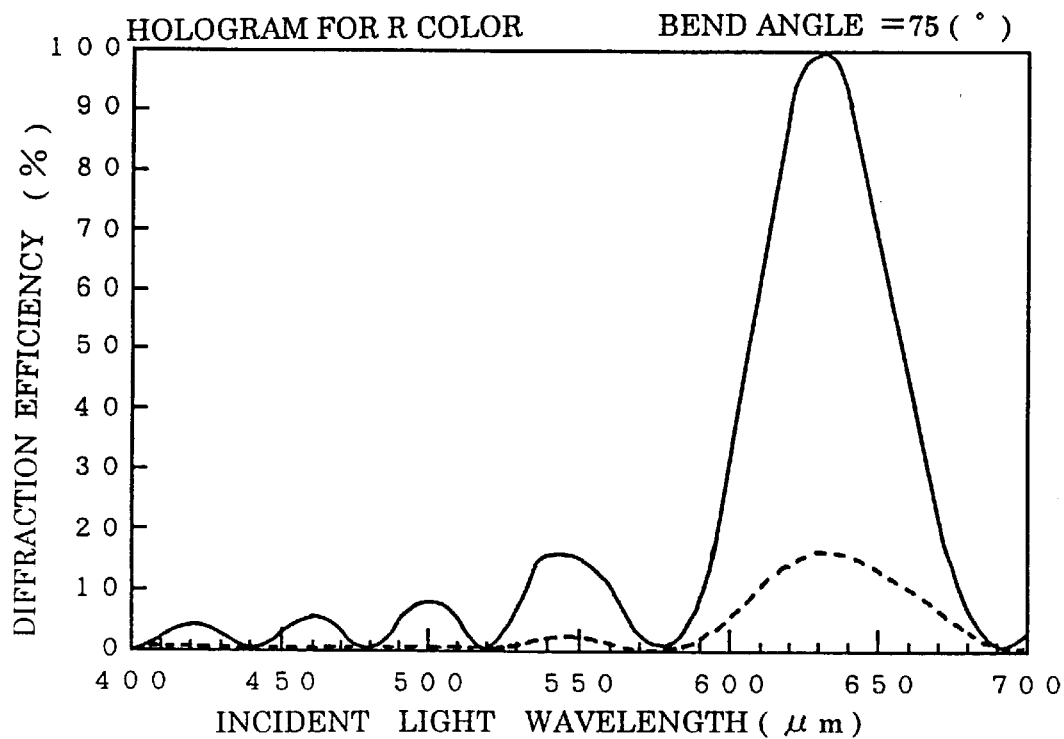
FIG. 15 is a graph showing diffraction efficiency characteristics of P and S polarized light components of an incident light having wavelength range of 400 to 700 nm of a hologram for R color prepared under the optimized design condition with bend angle being 75 degrees.
Figure 17:
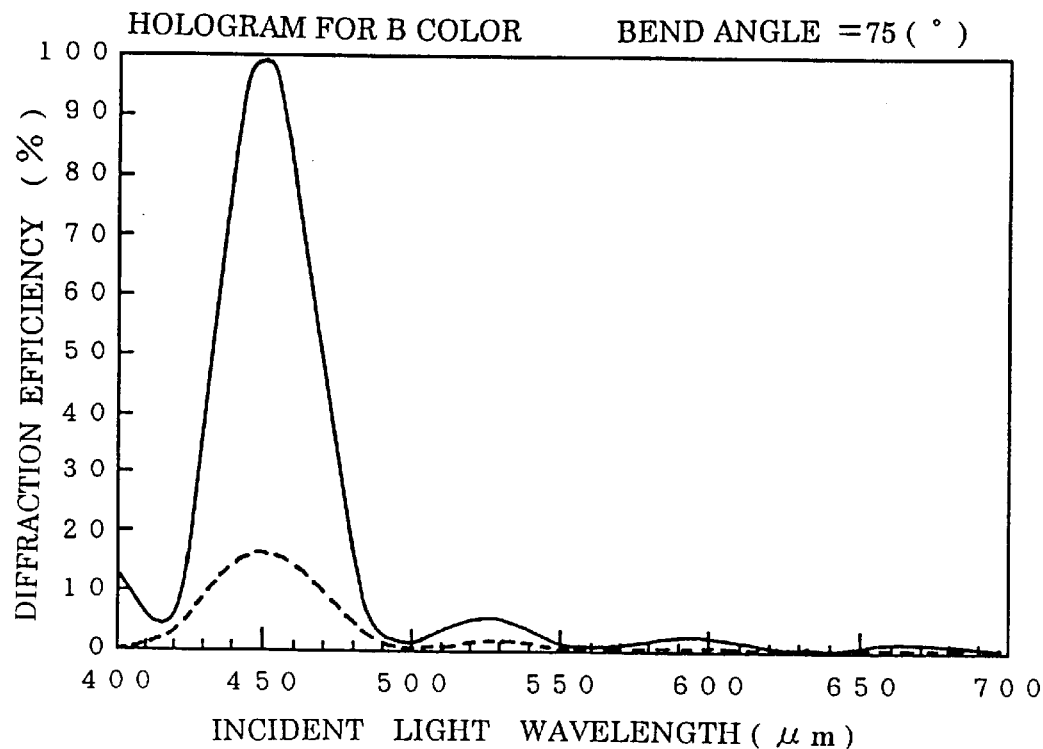
FIG. 17 is a graph showing diffraction efficiency characteristics of P and S polarized light components of an incident light having wave-length range of 400 to 700 nm of a hologram for B color prepared under the optimized design condition with bend angle being 75 degrees.

Further, similarly to the diffraction efficiency characteristics shown in FIGS. 15 and 17 explaining Japanese Patent Application H7-315956, the diffraction efficiency of the P and S polarized light components have a large dependency on wavelength. Further, it is possible to design the color filter optimally such that a similar diffraction efficiency characteristics to the above mentioned can be obtained at a specific wavelength.

Therefore, it is possible to realize holograms for other R and B colors which have high diffraction efficiencies η p of the P polarized light component while restricting diffraction efficiencies of the S polarized light component.

Further, it is possible to realize diffraction efficiency more than 30% for us to arrange the thickness t of the hologram and the modulation amount Δn of diffractivity, furthermore by the most suitable arrangement we can get more large the difference between diffraction efficiency of the P polarized light component and that of the S polarized light component, as describe specifically in the following embodiments.

Now, an output operation of projection light in the reflection type color picture projector.

First, a read light is directed to an incident surface of the coupling prism 5, passes through the prism 5 and the glass substrate 4 and is incident obliquely on the color filter 3. In this embodiment, the incident angle of the read light to the color filter 3 is set as 60 degrees and the incident surface of the coupling prism 5 is formed vertically to an incident direction of the read light.

The read light incident on the color filter 3 is first spectroscopically separated and diffracted by the holography lens array layer 3r for R color. The holography lenses 3re of the array layer 3r diffract only P polarized light component of light having wavelength range related to R color mainly while allowing components contained in the read light and having other wavelength range and S polarized light component having wavelength range related to R color to pass therethrough.

In concrete, the holography lenses 3re diffract the P polarized light component having wavelength range related to R color with diffraction efficiency close to 100% while restricting diffraction efficiency of the S polarized light component to 5% or smaller, and make the diffracted light a condensed light bundle targetting the pixel electrode 13r for R color on the side of the LCD panel 1 positioned on an optical axis of the diffracted light by the lens function thereof.

Incidentally, the S polarized light component in the wavelength range related to R color becomes a slightly diffracted light and becomes a condensed light bundle similarly to the P polarized light component.

Therefore, the holography lenses 3re of the array layer 3r direct the P polarized light component in the wavelength range related to R color and the condensed light bundle composed of the small amount of S polarized light component in that wavelength range vertically to the holography lens array layer 3g for G color. Further, it allows the light components in other wavelength range than that for R color and the S polarized light components in the wavelength range for R color which are not diffracted to pass therethrough to thereby direct them to the holography lens array layer 3g for G color along the propagating direction of the read light.

Then, in the holography lens array layer 3g, the holography lenses 3ge diffract only the P polarized light component of lights in the wave-length range related to G color mainly. Therefore, they diffract, among lights passed through the holography lens array layer 3r for R color as they are, the P polarized light component in the wavelength range related to G color with diffraction efficiency of about 100%. The holography lenses 3ge further diffract the S polarized light component with diffraction efficiency limited to 5% or less and make it a condensed light bundle targetting the pixel electrodes 13g for G color of the LCD panel 1 which are positioned on the axes of the respective lenses 3ge.

On the other hand, the vertically incident light bundle including the P polarized light component in the wavelength range for R color and the small amount S polarized light component in the same wavelength range is incident on the holography lens array layer 3b for B color as it is. Further, components of lights passed through the holography lens array 3r for R color as they are, which include light components in the wavelength ranges for R and G colors, the S polarized light component in the wavelength range for R color and the S polarized light component in the wavelength range for G color and which are not diffracted by the layer 3g are pass through the latter layer as they are and incident on the holography lens array layer 3b for B color along the propagating direction of the read light.

Then, the respective holography lenses 3be of the holography lens array layer 3b is adapted to diffract only the P polarized light component of lights in the wavelength range related to B color mainly. Therefore, they diffract, among lights passed through the holography lens array layers 3r and 3g for R and G colors as they are, the P polarized light component in the wavelength range related to B color with diffraction efficiency of about 100% and diffract the S polarized light component with diffraction efficiency limited to 5% or less and make it a condensed light bundle targetting the pixel electrodes 13b for G color of the LCD panel 1 which are positioned on the axes of the respective lenses 3be.

On the other hand, the respective vertically incident light bundles for R and G colors are directed to the thin glass layer 2 as they are. Further, components of lights passed through the holography lens array 3g for G color as they are, which include light components in the wavelength range other than the wavelength ranges for R, G, and B colors, the S polarized light component in the wavelength ranges for R and G colors and the S polarized light component in the wavelength range for B color and which are not diffracted by the layers 3r and 3g are pass through the latter layer as they are and directed to the thin glass layer 2 along the propagating direction of the read light.

As a result, the following lights are emitted from the color filter 3:

(1) the condensed light bundle targetting the pixel electrodes 13r, which includes the P polarized light component in the wavelength range for R color and the small amount S polarized light component in the same wavelength range,
(2) the condensed light bundle targetting the pixel electrodes 13g, which includes the P polarized light component in the wavelength range for G color and the small amount S polarized light component in the same wavelength range,
(3) the condensed light bundle targetting the pixel electrodes 13b, which includes the P polarized light component in the wavelength range for B color and the small amount S polarized light component in the same wavelength range,
(4) the zero order light including components in wavelength range other than those for R, G, and B colors and small amount S polarized light component in the wavelength ranges for R, G, and B colors.

The light bundles (1) to (3) are incident on the LCD panel 1 and then condensed on the corresponding pixel electrodes 13r, 13g and 13b of the pixel electrode layer 13 through the common electrode film 18, the orientation film 17, the optical modulation layer 16 and the orientation film 15. Then, these light bundles are reflected by the dielectric mirror film 14 on the pixel electrodes 13r, 13g and 13b and become scattering light bundles which are incident again on the corresponding holography lenses 3re, 3ge and 3be of the color filter 3.

Incidentally, the respective pixel electrodes 13r, 13g and 13b are supplied with control voltages corresponding to the video signal and determining the state of the pixel from the active matrix drive circuit 12. Since, therefore, the orientation state of the liquid crystal of the optical modulation layer is changed upon the potential between the common electrode film 18 and the respective pixel electrodes 13r, 13g, and 13b, the P polarized light components of the light bundles (1) to (3) are modulated correspondingly to the control voltages during their reciprocal passages between the color filter 3 and the LCD panel 1 and incident again on the holography lenses 3re, 3ge, and 3be.

That is, when the P polarized light component is modulated by X%, (100−X)% of the P polarized light component remains as P polarized light and X% thereof is changed to S polarized light and incident again on the holography lenses 3re, 3ge, and 3be.

Figure 9:
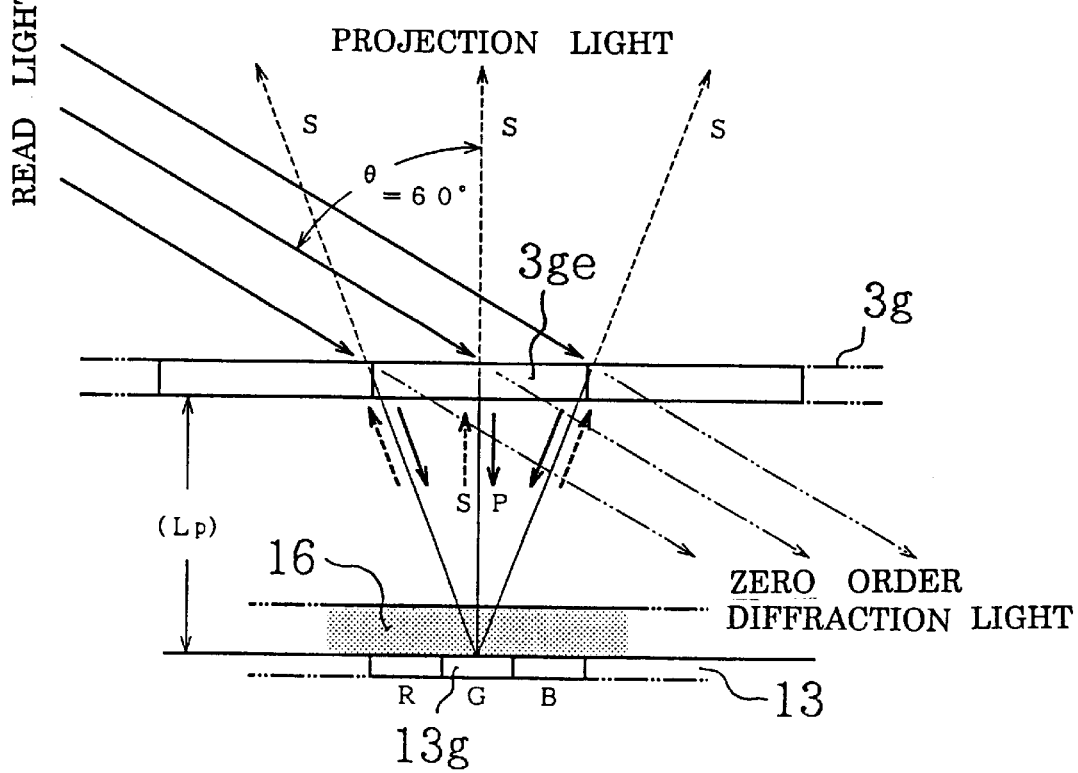
FIG. 9 graphically shows a process in which, in the reflection type color picture projector according to the first embodiment, a read light is diffracted and spectroscopically separated by the holography lens for G color, a resultant P modulated component is condensed to pixel electrodes corresponding to the color, reflected and modulated by the pixel electrodes and re-incident on the holography lens and an S polarized component after modulated is transmitted through the holography lens as the projection light.

FIG. 9 shows graphically the above mentioned state for the P polarized light component in the wavelength range for G color. The P polarized light component diffracted by the holography lens 3ge is condensed to a substantial center of the pixel electrode 13g on the optical axis of the lens. When the condensed light is modulated by the liquid crystal of the optical modulation layer 16, a portion or the whole of the condensed light is converted into S polarized light component and incident on the holography lens 3ge. In this case, the light modulated is incident again on the holography lens 3ge through an optical path symmetrical about the optical axis to the incident optical path to the pixel electrode 13g. Incidentally, although the incident angle to and the reflection angle from the pixel electrode 13g are shown exaggerated in FIG. 9, these angles are very small practically.

Since the holography lens 3ge diffracts the P polarized light component mainly as mentioned previously, the S polarized light component obtained by the modulation passes through the holography lens 3ge as it is.

The above mentioned operation is similarly applicable to R and G colors.

As a result, the S polarized light components related to the respective colors which are obtained by modulation pass the color filter 3 as they are and are emitted from the glass substrate 4 through the coupling prism 5 as shown in FIG. 1.

On the other hand, the P polarized light components which are not modulated and the P polarized light components which are obtained by modulation from the S polarized light component slightly diffracted by the color filter 3 are incident again on the color filter 3 and then return toward the source of the read light.

The zero order light in (4) propagates through the thin glass layer 2 and is incident on the LCD panel 1 at an incident angle of 60 degrees which is the same as that of the read light, reflected by the dielectric mirror film 14 at a reflection angle of 60 degrees and then incident again on the color filter 3 at an incident angle of −60 degrees.

However, the holography lenses 3re, 3ge, and 3be of the holography lens array layers 3r, 3g, and 3b constituting the color filter 3 have no diffraction characteristics for the incident angle (−60 degrees) and the re-incident zero order light passes through the color filter 3 and is emitted from a surface thereof opposite to the incident surface of the read light after passed through the glass substrate 4 and the coupling prism 5.

The feature of this embodiment resides in that the S polarized light components related to the respective colors and passed through the color filter 3 are utilized as the projection light, as mentioned previously. That is, although, in the projector disclosed in Japanese Patent Application No. H7=315956, the color filter diffracts and spectroscopically separates the S polarized light component mainly and the P polarized light component is utilized as the projection light according to the same principle, the S polarized light component is utilized in this embodiment.

The advantage of the projector according to this embodiment is proved by the diffraction efficiency characteristics of the color filter 3 described in detail hereinbefore.

In the reflection type color picture projector, it is preferable, in order to improve the illumination efficiency of a read light, to increase a cross sectional area of the read light. However, when, in order to increase the cross sectional area of the read light, an incident angle θ of the read light to the color filter is reduced, the difference in diffraction efficiency between S polarized light component and P polarized light component of the read light becomes small so that the utilization factor of light is lowered in a case where the read light is diffracted and spectroscopically separated and one polarized light component thereof is used as a projection light as in the projector disclosed in Japanese Patent Application No. H7-315956 or in the projector of this embodiment.

However, the projector disclosed in Japanese Patent Application No. H7-315956 employs the condition of the A point in FIG. 18 and the projector of this embodiment employs the condition of the point B in the same figure. The projector of this embodiment gives a very high diffraction efficiency to the P polarized light component while minimizing the diffraction efficiency of the S polarized light component and can substantially improve the utilization factor of light, compared with the projector disclosed in Japanese Patent Application No. H7-315956.

In other words, there is a margin in reducing the incident angle of the read light in this embodiment and, even when the incident angle θ is reduced to as small as 60 degrees, it is possible to keep the diffraction efficiency of the P polarized light component at 100% while restricting the diffraction efficiency of the S polarized light component to about 3% and to improve the illumination factor of the read light while setting the utilization factor of light at a high value.

The color filter 3 according to this embodiment is constructed by recording a pattern of the holography lenses 3re, 3ge, and 3be on hologram sensitive material sheets prepared for the respective three primary colors and laminating the three sensitive material sheets. However, it may be possible to multi-record unit holograms having similar diffraction and spectroscopic separation function to that of the holography lenses 3re, 3ge, and 3be on a single hologram sensitive sheet.

In such case, there is no need of positional alignment of the respective layers and thus a computer hologram, etc., can be applied thereto.

Although, in this embodiment, there is no limitation applied to the read light, in order to improve the contrast ratio, it may be possible to preliminarily limit the read light to a P polarized light component which is directed to the color filter.

Further, although this embodiment has been described for the case where liquid crystal is used as the optical modulation layer, any material other than liquid crystal can be applied to the optical modulation layer depending upon the control manner thereof so long as the material can modulate polarized components of light.

[Embodiment 2]

The second embodiment relates to an improvement of the projector according to the first embodiment such that, in emitting the projection light which is the S polarized component from the color filter 3, the utilization factor of light is prevented from being reduced due to the returning of a portion of the projection light toward the source of read light.

In FIG. 9, the read light beam is incident on the holography lens 3ge and diffracted at the incident point. Then, it is incident on substantially the center of the pixel electrode 13g on the optical axis of the holography lens 3ge, reflected by the pixel electrode 13g and incident on the holography lens 3ge again. The re-incident point is, however, in a position symmetrical about the optical axis of the holography lens 3ge in the initial incident point.

The incident direction to the re-incident point coincides with the direction of the read light beam which is incident on the re-incident point, diffracted and spectroscopically separated thereat and directed to the substantial center of the pixel electrode 13g.

As mentioned with respect to the first embodiment, light re-entering to the holography lens 3ge is the S polarized component corresponding to the degree of modulation of the optical modulation layer 16, which S polarized component is passed through the holography lens 3ge and used as the projection light.

On the other hand, the holography lens 3ge is adapted to diffract and spectroscopically separate the P polarized component of the read light. In the first embodiment, even when the holography lens 3ge having the characteristics shown in FIG. 5, 7, or 8 and giving the optimized diffraction condition is used, the diffraction efficiency of the S polarized component is as small as about 3%.

Therefore, all of the S polarized lights modulated and re-incident on the holography lens 3ge do not pass therethrough as they are. On the basis of the principle of reversibility of light-path, a portion of the S polarized lights corresponding to the diffraction efficiency characteristics of the S polarized component of the holography lens 3ge is returned from the re-incident point toward the source of read light. That is, although the diffraction efficiency is small, the optimized diffraction condition is given to the re-incident S polarized component at the re-incident point.

Further, in the vicinity of the re-incident point, a condition which is not optimum but approximating the optimized condition is established and similar phenomenon occurs.

This phenomenon also occurs in the other holography lenses 3re and 3be and so a portion of the S polarized component which is to be emitted from the color filter 3 as the projection light is lost. As a result, the utilization factor of light is necessarily lowered.

In the second embodiment, the above problem is solved by employing means for deviating an optical distance Lp between the color filter 3 and the pixel electrode layer 13 (in more strictly, an optical distance between the holography lenses 3re, 3ge, and 3be and the dielectric mirror film 14 covering the surface of the pixel electrode layer 13) from a focal length due to the diffraction function of the color filter 3 (in more strictly, a focal length of the holography lenses 3re, 3ge and 3be).

Figure 10:
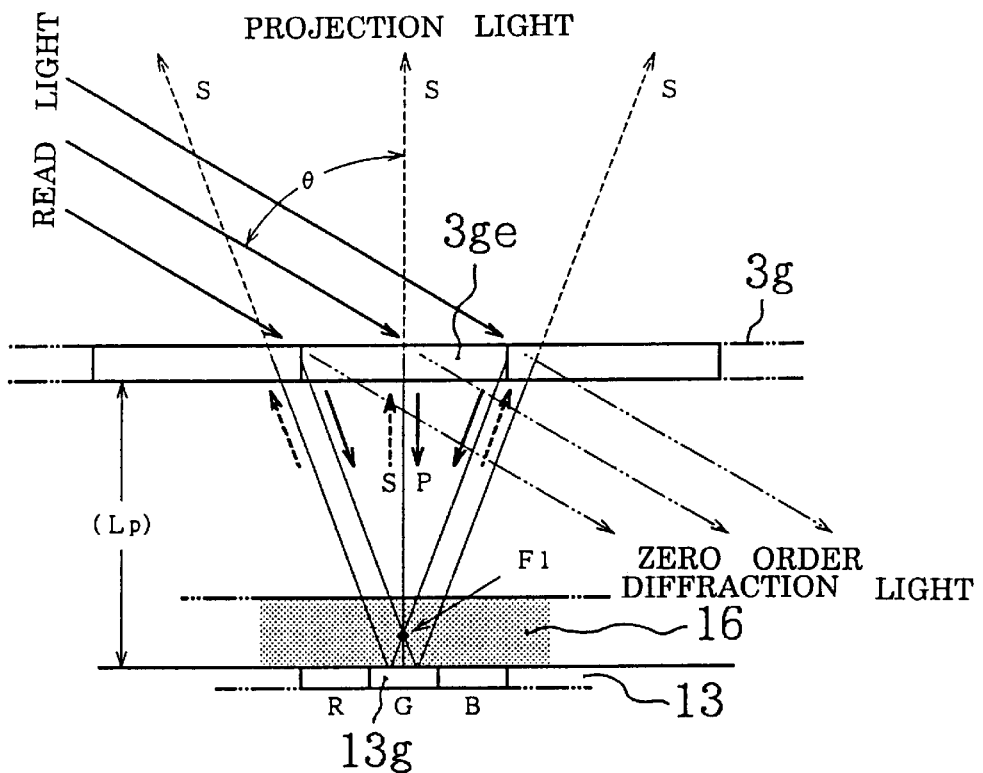
FIG. 10 graphically shows a process in which, in the reflection type color picture projector according to the second embodiment, a read light is diffracted and spectroscopically separated by the holography lens for G color, a resultant P modulated component is condensed to a focal point behind a reflection plane of pixel electrodes corresponding to the color, reflected and modulated by the pixel electrodes and re-incident on the holography lens and an S polarized component after modulated is transmitted through the holography lens as the projection light.
Figure 11:
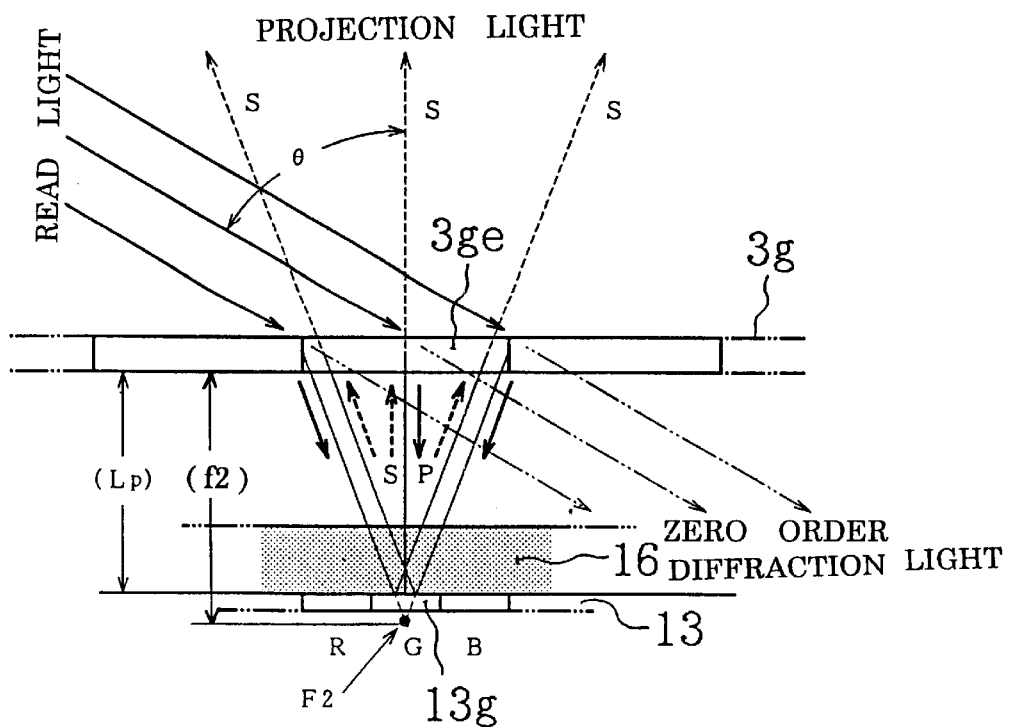
FIG. 11 graphically shows a process in which, in the reflection type color picture projector according to the second embodiment, a read light is diffracted and spectroscopically separated by the holography lens for G color, a resultant P modulated component is condensed to a focal point before a reflection plane of pixel electrodes corresponding to the color, reflected and modulated by the pixel electrodes and re-incident on the holography lens and an S polarized component after modulated is transmitted through the holography lens as the projection light.
Figure 14:
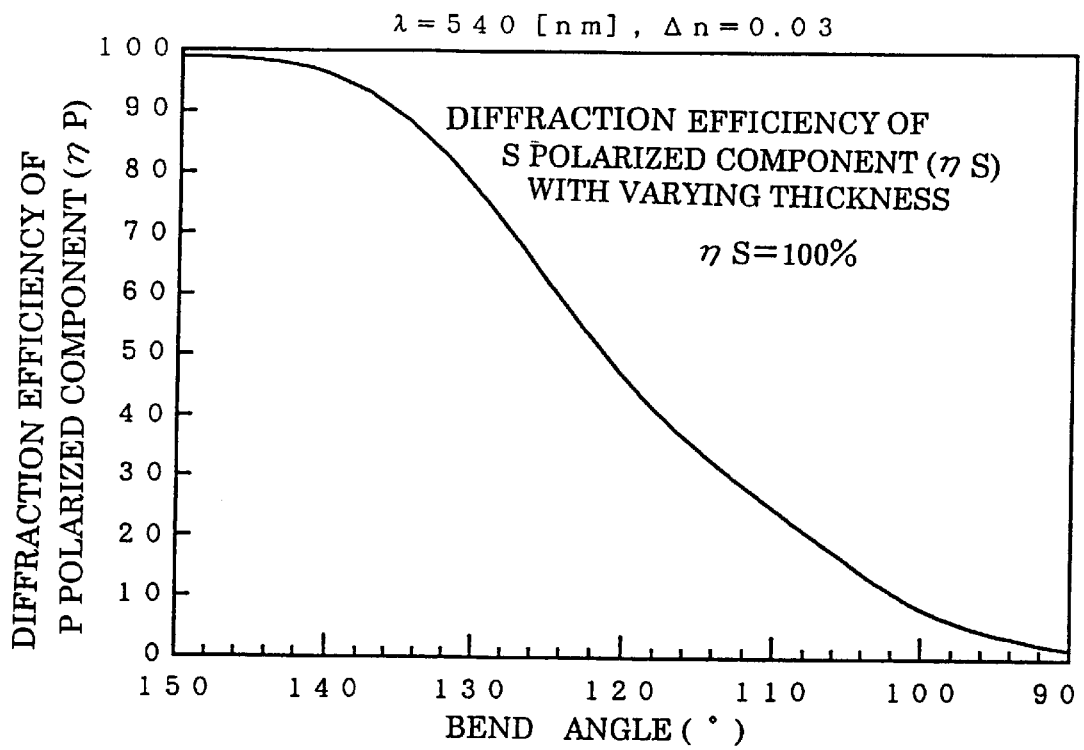
FIG. 14 is a graph showing a variation of diffraction efficiency η p of P polarized light component of a hologram when bend angle is changed while the diffraction efficiency η s of S polarized light component being kept at 100% by changing thickness t under condition of incident light wavelength λ of 540 nm and modulation amount Δn of diffraction of 0.03.

A concrete construction is shown graphically in FIGS. 10 and 11.

FIG. 10 shows an example in which the optical distance Lp is longer than the focal length of the holography lens 3ge.

In this case, the focal length of the holography lens 3ge is denoted by f1. The read light beam incident on the holography lens 3ge is condensed to the focal point (F1). The beam propagates from the focal point F1, reflected by the pixel electrode 13g and re-incident on the holography lens 3ge.

Considering beams re-incident on the holography lens 3ge through other paths than the optical axis thereof, there is no case where these beams become symmetrical about the optical axis of the holography lens 3ge to the light beam emitted from the holography lens 3ge so long as the light beam from the holography lens 3ge passes through the focal point F1. That is, the read light beam incident on the re-incident point propagates toward the focal point F1 while the light beam reflected by the pixel electrode 13g is re-incident on the re-incident point without passing through the focal point F1. Therefore, such beam becomes out of the optimized diffraction condition of the holography lens 3ge.

As is clear from FIG. 10, the read light beams incident on opposite end areas of the holography lens 3ge are reflected by the pixel electrode 13g and then re-incident on the adjacent other holography lenses. Therefore, they are completely different from the optimum diffraction condition.

Consequently, by employing the construction shown in FIG. 10, although about 3% of the S polarized component is lost in only a very small area in the vicinity of the optical axis of the holography lens 3ge, all of the S polarized component re-incident on the other area becomes the projection light. Thus, the utilization factor of light is improved.

FIG. 11 shows an example in which the optical distance Lp is shorter than the focal length of the holography lens 3ge.

In this case, the focal length of the holography lens 3ge is denoted by f2. The read light beam incident on the holography lens 3ge propagates toward the focal point (F2). Before the beam reaches the focal point F2, it is reflected by the pixel electrode 13g and re-incident on the holography lens 3ge.

Therefore, it is completely different from the optimum defraction condition in other area than the vicinity of the optical axis of the holography lens 3ge as in the former example shown in FIG. 10 and almost all of the S polarized component re-incident on the holography lens 3ge becomes the projection light. Thus, the utilization factor of light is improved FIG. 11 shows an example in which the optical distance Lp is shorter than the focal length of the holography lens 3ge.

Incidentally, the second embodiment has been described as being applied to the projector according to the first embodiment. However, according to the principle employed in the second embodiment, the kind of polarized light to be used as the projection light is not limited and, therefore, the second embodiment can be applied to the projector disclosed in Japanese Patent Application No. H7-315956.

Particularly, in the projector disclosed in Japanese Patent Application No. H7-315956, the holography lenses diffract the S polarized light component mainly. Based on the diffraction efficiency characteristics shown in FIGS. 15 to 17, the S polarized light component is modulated and about 15% of the P polarized light component which ultimately becomes the projection light is lost. Therefore, the application of the second embodiment to the projector disclosed in Japanese Patent Application No. H7-315956 also attributes to the improvement of the utilization factor of light.

The color filter and the color picture projector according to the present invention having the constructions mentioned hereinbefore provide the following effects.

According to the present invention, the color filter using transmission type hologram is provided, which can improve the utilization factor of light of the reflection type color picture projector when applied thereto on the basis of the fact that, in diffracting one of polarized light components of the incident light, the difference in diffraction efficiency between the S polarized light component and the P polarized light component becomes larger when the P polarized light component rather than the S polarized light component is diffracted.

Further, the present invention makes possible to provide the lens function of the color filter which has a large aperture rate in condensing the incident light to the color pixel areas after diffracted and spectroscopically separated even when the color pixel areas are arranged in dense and realizes the color filter whose manufacture is easy and whose preciseness is high. Further, the present invention facilitates the optimized design of the color filter in order to prepare the hologram thereof having the wavelength dependency.

Further, the present invention is based on the fact that, in the color filter mentioned above, it is possible to set the diffraction efficiency of the P polarized light component at substantially 100% while restricting the diffraction efficiency of the S polarized light component to as low as 5% or less even if the incident angle of the incident light is as small as about 60 degrees and makes possible to improve the utilization factor of light while increasing the illumination light factor of the read light when the color filter is applied to the reflection type color picture projector.

Further, the present invention provides the color picture projector to which the present color filter is applied and which makes a display of a color picture of high luminance and high contrast possible.

Further, the present invention removes the phenomenon that, in the present color picture projector or the projector disclosed in Japanese Patent Application No. H7-315956, a portion of the polarized component which becomes the projection light returns toward the source of read light due to the difficulty of obtaining the ideal diffraction efficiency characteristics of the hologram of the color filter in which only one of the polarized light components is diffracted while the other is not diffracted, improves the utilization factor of light and prevents the contrast from being lowered.

What is claimed is:

1. A color filter provided with hologram means for spectrally diffracting an incident light into a plurality of light beams of different wavelength ranges, and selectively condensing the plurality of light beams on respective plurality of picture element electrodes corresponding to the different wavelength ranges, wherein the hologram means is arranged so that the thickness t of the hologram and the modulation amount $\Delta n$ of diffractivity is set under condition wherein P polarized components of the incident light, in a center wavelength of the different wavelength ranges and having a vibration plane parallel to an incident plane, are diffracted at approximately maximum diffraction efficiency at a predetermined incident angle of the incident light, and S polarized components of the incident light, in a center wavelength of the different wavelength ranges and having a vibration plane vertical to an incident plane, are diffracted such that a difference between the maximum diffraction efficiency of the P polarized components and the diffraction efficiency of the S polarized components is not less than 30%, with the diffracted P polarized components formed as the plurality of light beams to be converged on the plurality of picture element electrodes corresponding to the different wavelength ranges and wherein polarization directions of the P polarized components and the S polarized components are orthogonal to each other.

2. A color filter as claimed in claim 1, wherein the predetermined angle is 60 degree.

3. A color filter as claimed in claim 1, wherein said hologram has a diffraction efficiency characteristics in which diffraction efficiency of the P polarized light components related to the respective spectroscopic colors is about 100% and that of the S polarized light components related to the respective spectroscopic colors is 5% or less in a case where an incident angle of the incident light is about 60 degrees.

4. A color filter comprising a hologram for diffracting and spectroscopically separating an incident light into a plurality of light components having different wavelength ranges and selectively condensing the light components to corresponding color pixel positions, said hologram adapted to diffract and spectroscopically separate mainly a P polarized light component of the incident light having a vibration plane parallel to an incident plane thereof and condense the diffracted and spectroscopically separated P polarized light component to said corresponding color pixel positions while transmitting an S polarized light component having a vibration plane vertical to the incident plane wherein said hologram is prepared by laminating a plurality of hologram sensitive material sheets prepared for the respective spectroscopic colors and recorded with holography lens arrays with wavelength dependent diffraction efficiencies for the respective spectroscopic colors or by a single hologram sensitive material sheet having overlapping holography lens arrays with wavelength dependent diffraction efficiencies for the respective spectroscopic colors and with the hologram having a thickness t and modulation amount $\Delta n$ of diffractivity arranged so that the P polarized components of the incident light are diffracted at approximately maximum diffraction efficiency and the S polarized components of the incident light are diffracted at substantially lower diffraction efficiency wherein said hologram has a diffraction efficiency characteristics in which diffraction efficiency of the P polarized light components related to the respective spectroscopic colors is about 100% and that of the S polarized light components related to the respective spectroscopic colors is 5% or less in a case where an incident angle of the incident light is about 60 degrees.

5. A reflection type color picture display device comprising at least a color filter having a hologram, an optical modulation layer and a reflection layer, wherein said color filter diffracts and spectroscopically separates mainly P polarized light components of an obliquely incident read light having a vibration plane parallel to an incident plane thereof and condenses it to corresponding color pixel positions in said reflection layer while transmitting S polarized light components having a vibration plane vertical to the incident plane and wherein said P polarized light components diffracted and spectroscopically separated by said color filter are transmitted through said optical modulation layer, reflected by said reflection layer, re-transmitted through said optical modulation layer and incident on said color filter and wherein said P polarized light components, which were diffracted and passed through said optical modulation layer, are reflected and again passed through said optical modulation layer thus converting said P polarized light components to S polarized light components for use as a projection light wherein said hologram of said color filter has a diffraction efficiency characteristics in which diffraction efficiency of the P polarized light components related to the respective spectroscopic colors is about 100% and that of the S polarized light components related to the respective spectroscopic colors is 5% or less in a case where an incident angle of the incident light is about 60 degrees and wherein the incident angle of the incident light on said color filter is set to about 60 degrees.

6. A color picture display device comprising at least a color filter having a hologram, an optical modulation layer and a reflection layer, said color filter being adapted to diffract and spectroscopically separate mainly one of P polarized light components of an obliquely incident read light having a vibration plane parallel to an incident plane thereof or S polarized light components thereof having a vibration plane vertical to said incident plane and to condense them to corresponding color pixel positions in said reflection layer while transmitting the other polarized light components as they are and, among light components obtained from said polarized light components diffracted and spectroscopically separated by said color filter which are transmitted through said optical modulation layer, reflected by said reflection layer, transmitted again through said optical modulation layer and incident on said color filter, with the polarized light components which are modulated by said optical modulation layer and transmitted through said color filter without diffraction being used as a projection light, wherein an optical distance between said color filter and said reflection layer is shorter than a focal length produced by the diffraction function of said color filter.

7. A color picture display device comprising at least a color filter having a hologram, an optical modulation layer and a reflection layer, said color filter being adapted to diffract and spectroscopically separate mainly one of P polarized light components of an obliquely incident read light having a vibration plane parallel to an incident plane thereof or S polarized light components thereof having a vibration plane vertical to said incident plane and to condense them to corresponding color pixel positions in said reflection layer while transmitting the other polarized light components as they are and, among light components obtained from said polarized light components diffracted and spectroscopically separated by said color filter which are transmitted through said optical modulation layer, reflected by said reflection layer, and again transmitted through said optical modulation layer and incident on said color filter, with the polarized light components which are modulated by said optical modulation layer and transmitted through said color filter without diffraction being used as a projection light, wherein an optical distance between said color filter and said reflection layer is longer than a focal length produced by the diffraction function of said color filter.

\* \* \* \* \*